Dec. 28, 1948.        H. A. CLARKE        2,457,794
FAILURE INDICATING CONTROL APPARATUS
Filed June 21, 1946
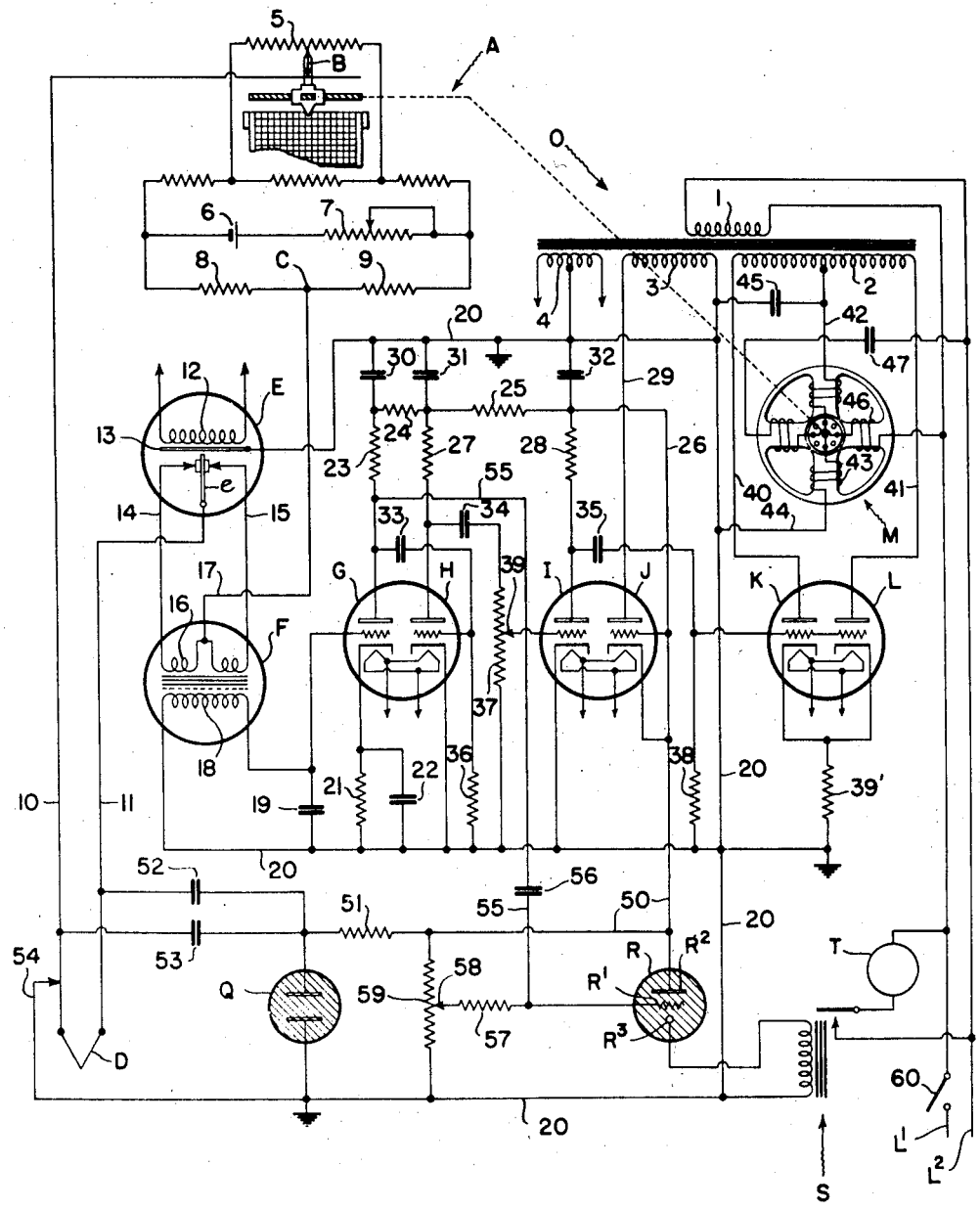
INVENTOR.
HERBERT A. CLARKE
BY Arthur H. Swanson
ATTORNEY.

Patented Dec. 28, 1948

2,457,794

UNITED STATES PATENT OFFICE 2,457,794

FAILURE INDICATING CONTROL APPARATUS

Herbert A. Clarke, Merion, Pa., assignor to The Brown Instrument Company, Philadelphia, Pa., a corporation of Pennsylvania Application June 21, 1946, Serial No. 678,254

17 Claims. (Cl. 318—28)

The present invention relates to potentiometric apparatus for measuring a small D. C. voltage, and particularly a thermocouple voltage, and the general object of the present invention is to provide improved means for actuating an indicating or control element on, and in response to, thermocouple rupture, or analogous apparatus failure.

More specifically, the object of the invention is to provide self-balancing potentiometric measuring apparatus of well known type comprising a reversible rebalancing motor and an electronic amplifying system through which the operation of the motor is controlled, with novel and effective means for utilizing the electronic system in effecting an automatic actuation of an indicating or control relay on a break in the thermocouple whose voltage is being measured.

Measuring apparatus of the known type mentioned above is characterized by the use of conversion means operating on a change in the voltage being measured to impress a corresponding alternating current rebalancing signal on the input circuit of the electronic amplifying system. That signal is of commercial frequency, usually 60 cycles per second, and is proportional in magnitude to the measuring circuit unbalance produced by said voltage change, and is of one phase, or the opposite phase, accordingly as the unbalance is in one direction or the other. The rebalancing signal thus impressed on said system is amplified therein and energizes a rebalancing motor control winding which is connected to the output circuit of the system, and thereby energizes the motor for operation in the direction and to the extent required to rebalance the measuring apparatus.

In accordance with the present invention, the above-described apparatus of known type is combined with means, operating automatically on a rupture of a thermocouple connected to the apparatus for voltage measurement, to impress on the input circuit of the electronic amplifying system a second, or rupture-indicating, signal, and with rupture detecting means operating in response to said second signal, after some amplification thereof, to actuate a suitable indicating or control device. Said detector means is selectively responsive to said second signal in the sense that it is operatively actuated by that signal and not by the rebalancing signal. To make such selectivity possible the second, or rupture-indicating, signal must differ in character from the rebalancing signal. In the preferred form of the invention illustrated herein, the rupture-indicating signal is an oscillating signal of much greater amplitude or strength than the rebalancing signal. Preferably, the rupture-indicating signal also differs in character from the rebalancing signal, in that it has an oscillation frequency substantially higher than the frequency of alternation of the rebalancing signal.

The various features of novelty which characterize my invention are pointed out with particularity in the claims annexed to, and forming a part of this specification. For a better understanding of the invention, however, its advantages, and specific objects attained by its use, reference should be had to the accompanying drawing and descriptive matter in which I have illustrated and described a preferred embodiment of the invention.

The one figure of the drawing is a circuit diagram.

In the embodiment of the invention illustrated diagrammatically in the drawing, A represents a potentiometric measuring circuit or network of conventional form, shown as comprising a slide wire resistance, engaged by a slider contact B, and a fixed point C which normally differs in potential from the slider contact B by an amount depending on the adjustment of the latter. A thermocouple D is connected between the slider contact B and network point C in series with conducting portions of vibrator and transformer elements E and F, respectively. Those elements collectively form the conversion portion of the amplifying and motor control apparatus.

In the balanced condition of the measuring network the D. C. voltage difference between the slider contact B and point C is equal in magnitude to the thermocouple voltage but opposite in polarity to the latter. When a change in thermocouple temperature and voltage occurs, the network is unbalanced and current flows through the thermocouple. Thereupon the elements E and F cooperate to impress an alternating current rebalancing signal on the input circuit of the electronic amplifying system. The rebalancing signal is proportional in magniude to said voltage difference, is of predetermined frequency, and is of one phase or of an opposing phase accordingly as the network unbalance is in one direction or in the opposite direction.

The electronic amplifying system comprises voltage amplifying valves G, H and I by which the signal is successively amplified, a rectifier valve J which supplies unidirectional current to the anodes of the valves G, H and I, and motor driving valves K and L, on the control grids of which the signal amplified by the valves G, H and I is impressed. The output circuits of the valves K and L form the output circuit of the electronic system, and energize the control winding of a reversible electric motor M which operates to effect rebalancing adjustments of the slider contact B.

The motor M has a power winding energized by alternating current supply conductors L' and L². The latter also supply current to the primary winding 1 of the transformer O. The latter has a secondary winding 2 supplying current to the anodes of the valves K and L, and has another secondary winding 3 supplying current to the anode circuit of the rectifier valve J, and has a third secondary winding 4 which supplies energizing current to the heating filaments of valves G, H, I, J, K and L, and to the vibrator E.

The apparatus elements just mentioned are combined for the purpose of the present invention with elements such as the gas-filled tubes Q and R, relay S and indicator T, shown in said drawing, as is hereinafter explained in detail.

As illustrated, the potentiometric network A is of conventional split potentiometer type, comprising three branches each connected at each end to the corresponding end of each of the two other branches. One of said branches includes a slide wire resistance 5 engaged by the slider contact B and along which the latter is adjusted by the motor M, a second branch includes an energizing battery 6 and a calibrating resistance 7, and the third branch includes resistors 8 and 9 at opposite sides of the previously mentioned network point C.

The thermocouple D has one terminal connected by a conductor 10 to the slider contact B, and has its second terminal connected to the network point C by means including a conductor 11, the vibrating armature or reed e of the vibrator element E and other conducting elements. The vibrator E includes an electromagnet coil or winding 12 having its terminals connected to the terminals of the transformer secondary winding 4. The coil 12 and associated electromagnet core 13 cause the reed e to vibrate with a frequency corresponding to the frequency of the alternating current supplied by the conductors L' and L². As the reed e vibrates, it alternately engages stationary contacts one of which is located at each side of the reed e. One of those contacts is connected by a conductor 14 to one end, and the other stationary contact is connected by conductor 15 to the second end of the energizing or inducing winding 16 of the transformer element F. A conductor 17 forms a center tap connection from the winding 16 to the potentiometer network point C.

Unidirectional currents which flow to the center tap conductor 17 alternately through the two sections or halves of the winding 16 from the conductors 14 and 15, respectively, induce an appropriate alternating current rebalancing signal in the secondary winding 18 of the transformer F. Thus, whenever the voltage of the thermocouple D is not equal and opposite to the potential difference between the slider contact B and point C, there is induced in the secondary winding 18 of the transformer device F, an alternating current proportional to the inducing current and of the same frequency as the current flowing in the winding 12 of the vibrator element E. The current so induced is in phase with, or is 180° out of phase with the last mentioned current, depending on whether the voltage of the thermocouple D exceeds, or is less than, the potential difference between the slider contact B and potentiometer network point C.

The transformer secondary winding 18 is shown as having one terminal connected to ground through a branched grounding conductor 20, through which numerous other ground connections, hereinafter mentioned, are made. The second terminal of the winding 18 is connected to the control grid of the valve G and is also connected to ground through a condenser 19. The cathode of the valve G is connected to ground through a biasing resistance 21 and a condenser 22 in parallel with said resistance. The cathodes of the valves H and I are connected directly to the grounding conductor 20. Resistors 23, 24 and 25 and a conductor 26 are connected in series in the order stated between the anode of the valve G and the cathode of the rectifier valve J. The cathode of the valve J is connected to the anode of the valve H through the conductor 26, resistor 25, and a resistor 27, and is connected to the anode of the valve I through the conductor 26 and resistor 28.

The anode of the valve J is connected through a conductor 29 to one terminal of the transformer secondary winding 3. The second terminal of the winding 3 is connected to ground and is therefore connected to the cathode of the valve J through the plate circuits of the valves G, H and I, each of which has its cathode connected to ground. The junction point of the resistors 23 and 24 is connected to ground through a filter condenser 30. Similarly, the common junction point of the resistors 24, 25 and 27 is connected to ground by a second filter condenser 31, and a third filter condenser 32 connects the junction of the resistors 25 and 28 to the ground connection 20. The filter comprising the condensers 30, 31 and 32, and resistors connected thereto, smooths out ripples in the currents supplied to the anodes of the valves I, H and G. The filtering means is desirably made effective to practically eliminate all ripple from the current supplied to the anode of the valve G, but need not effect an equally complete elimination of ripple from the currents supplied to the anodes of the valves H and I, where a small ripple component is relatively unimportant.

The output circuit of the valve G is coupled to the input circuit of the valve H, the output circuit of the valve H is coupled to the input circuit of the valve I, and the output circuit of the valve I is coupled to the input circuit of each of the valves K and L. The couplings are all of the resistance type comprising condensers 33, 34 and 35, respectively connected to ground by resistors 36, 37 and 38. The control grid of the valve H is connected to the output circuit of the valve G between the condenser 33 and resistor 36. The control grid of the valve I is connected to a slider contact 39 adjustable along the resistor 37. The control grids of the valves K and L are connected to the portion of the output circuit of the valve I which connects the condenser 35 to the resistor 38.

The valves G and H are triodes enclosed in a common envelope or twin tube. The valves I and J are also triodes enclosed in a common envelope or twin tube, but the rectifier valve J has its control grid connected directly to its cathode, so that the valve operates as a diode. The valves K and L, as shown, are triodes enclosed in a common envelope or twin tube. The cathodes of the valves K and L are connected to ground through a cathode bias resistance 39'. The anodes of the valves K and L are connected by conductors 40 and 41, respectively, to the left and right ends of the secondary winding 2 of the transformer O.

A conductor 42 connects the center tap or midpoint of the secondary winding 2 to one terminal of the control winding 43 of the motor M. The other terminal 44 of that winding is connected to ground. The first mentioned terminal of the winding 43 is connected to ground by a condenser 45. The power winding 46 of the motor M has one terminal directly connected to the supply conductor L', and has its second terminal connected to the supply conductor L² by a condenser 47.

For its intended use the motor M may well be of the form diagrammatically shown in the drawing, comprising one pair of oppositely disposed field poles surrounded by the winding 43, and a second pair of field poles at right angles to the first mentioned poles and surrounded by the winding 46. The rotor of the motor M is in the space between the adjacent ends of each pair of field poles. Each rebalancing signal impressed on the input circuit of the amplifier is approximately in phase with, or is displaced 180° from, the phase of the voltage between the supply conductors L' and L². However, the energizing current supplied to the control winding 43 either leads or lags by approximately 90° the voltage of the supply conductors L' and L², depending on the direction of network unbalance. Due to the action of the condenser 47, the current flowing through the motor winding 46 is in phase with the voltage of the alternating current supply conductors L' and L². The windings 43 and 46 thus cooperate to establish a magnetic field revolving in one direction or in the opposite direction, depending on the direction of network unbalance.

In normal operation with the thermocouple connected to the measuring network at a constant temperature, the measuring apparatus is balanced. The position of the contact B along the slide wire resistance 5 then forms a measure of the thermocouple voltage and temperature, and no rebalancing signal is then impressed on the amplifier input circuit. When a change in the thermocouple temperature and voltage occurs, the apparatus is unbalanced, and a rebalancing signal is impressed on the amplifier input circuit. The phase and magnitude of the rebalancing signal are respectively dependent on the direction and extent of network unbalance. The amplified rebalancing signal produces a current flow in the control winding 43 of the motor M which combines with current flow through the power winding 46 to create a revolving magnetic field producing motor rotation in the direction to move the slider contact B toward the position in which it will rebalance the apparatus.

As balance is attained, the rebalancing signal fades away and the rotation of the rotor is interrupted, although direct currents and alternating currents, of a frequency double that of the current supplied by the conductors L¹ and L², flow through the winding 43 during periods in which the rebalancing signal is non-existent.

Further explanations with respect to the apparatus elements shown in Fig. 1 and utilized in the normal measuring operation of the apparatus appear unnecessary to a proper understanding of the invention disclosed and claimed herein, particularly as conversion type potentiometers, including conversion means and voltage amplifying and motor drive systems of the character shown herein, are not only disclosed and claimed in Patent No. 2,423,540 of Walter P. Wills, granted July 8, 1947 on an application filed December 1, 1941, but are in general use in this country, and are also disclosed in the Wills Patent 2,398,341, granted April 9, 1946.

In accordance with, and for the purposes of, the present invention, means are provided for introducing successive current pulses into the thermocouple D. In normal operation with the thermocouple intact, those pulses pass to ground through a ground connection to the thermocouple without significant effect on the measuring or amplifying sections of the apparatus. On the occurrence of a break in the thermocouple, however, some, at least, of the current pulses introduced into the thermocouple pass from the latter to one section or the other of the winding 16 in the transformer element F. The resultant rupture-indicating signal produces a high level voltage pulse on the anode of the first voltage amplifying valve G, and the last mentioned pulse is utilized to effect actuation of a rupture indicator or control device.

The means shown for introducing current pulses into the thermocouple D comprises a conductor 50 connected at one end to the cathode of the rectifier valve J, and connected at its other end to one end of a resistor 51. The second end of the resistor 51 is connected to one leg or lead of the thermocouple by a condenser 52, and is connected to the other leg or lead of the thermocouple by a condenser 53. A grounding conductor 54 is connected to the thermocouple at some point intermediate the thermocouple points respectively connected to the condensers 52 and 53. A gas-filled, glow discharge tube Q, which may be of the commercially available type 991, has one element connected to the terminals of the condensers 52 and 53 which are connected to one end of the resistor 51. The second element of the tube Q is connected to ground. The tube Q thus forms a ground connection in parallel with the two ground connections which respectively include the condensers 52 and 53, and each of which includes the conductor 54.

The tube Q with its ground connections, the condensers 52 and 53 and their ground connections, and resistor 51 collectively form an oscillating circuit. When the voltage across the tube Q attains the tube breakdown voltage value, the tube Q becomes conductive. This results in a practically instantaneous reduction in the voltage across the tube Q and a rapid reduction in the charges on the condensers 52 and 53. As one consequence of the condenser charge reduction, the voltage across the tube Q is quickly reduced to a value insufficient to maintain the conductivity of the tube. After the tube is thus made non-conductive, charges are again rapidly accumulated by the condensers 52 and 53, with the result that the voltage across the tube Q quickly returns to the breakdown voltage value so that the tube again becomes conductive, and causes a reduction in the charges held by the condensers 52 and 53.

The periodicity or frequency with which the tube Q is thus made conductive depends upon the oscillating circuit element values which determine the time constant of the circuit. Those values are not critical except in the sense that it is desirable, though not essential, that the oscillation frequency should be significantly different from the frequency of the current supplied by the conductors L' and L². In ordinary practice the voltages at which the tube Q becomes conductive and becomes non-conductive may well be 87 volts and 48 volts, respectively, and the capacity of each of the condensers 52 and 53 may well be approximately .005 microfarad. The resistance of the resistor 51 may be 200,000 ohms, and the voltage transmitted from the cathode of the rectifier tube J to the oscillating circuit through the conductor 50 is ordinarily about 135 volts positive with respect to the ground potential when the electronic amplifying system is of the known type shown diagrammatically in the drawing. With the oscillating circuit elements just stated by way of example, the time constant of the oscillating circuit will be such that the oscillation frequency is substantially higher than the 60 cycle per second frequency of the current supplied by the conductors L' and L², and for example, may be of the order of 500 cycles.

The general operation of the oscillation circuit just described is not significantly varied by the occurrence of a thermocouple break, except in respect to the manner in which current pulses pass to ground from the condensers 52 and 53. When the thermocouple D is intact, the current pulses from each of the condensers pass to ground through the ground connection 54, without first passing through either section of the winding 16 and the measuring circuit bridge A.

When a break occurs in the thermocouple D between the points at which the latter is connected to the condensers 52 and 53 respectively, the discharge current pulse from the condenser 52 cannot pass through the thermocouple directly to the ground connection 54 if the thermocouple break is in the portion of the thermocouple between its point of connection to the conductor 54 and its point of connection to the condenser 52. In such case current pulses pass from the condenser 52 to the ground connection 54 through a circuit including the conductor 11, vibrator reed e, one at least of the conductors 14 and 15 and the corresponding section of the winding 16, conductor 17, measuring circuit A, slider contact B and conductor 10.

A break in the thermocouple between its points of connection to the conductor 54 and condenser 52 does not prevent the passage of current pulses from the condenser 53 directly to the ground connection 54 through the portion of the thermocouple between the points at which it is respectively connected to the conductor 54 and to the condenser 53. However, on a break in the portion of the thermocouple between the two last mentioned points, current pulses can pass to the ground connection 54 from the condenser 53 only through a circuit including the conductor 10, the slider contact B, the measuring circuit A, conductor 17, one section, at least, of the winding 16 and the corresponding conductor 14 or 15, reed e, conductor 11, and the portion of the thermocouple D between conductor 11 and the ground connection 54.

When as a result of thermocouple breakage, the current pulses discharged by one or the other of the condensers 52 and 53 pass through one section, at least, of the transformer winding 16, a rupture-detecting signal is induced in the transformer winding 18 and is impressed on the control grid of the amplifying valve G. The magnitude of that pulse is great enough to produce a high level voltage pulse on the anode of the valve G. That pulse is transmitted by the conductor 55 and a condenser 56, included in said conductor, to the control grid or starting electrode R' of a gas-filled, cold-cathode, glow-discharge tube R. The latter may be of the commercially available 1C21 type. The anode R² of the tube R is connected to the cathode of the rectifier valve J through the conductor 50, and the cathode R³ of the tube R is connected to ground through the winding of a relay S. As shown, the starting electrode of the tube R is connected to ground through resistors 57 and 59, the resistor 57 having one end connected to said electrode and having its other end connected to a slider contact 58 adjustable along a potentiometer resistance or voltage divider 59. The latter has one end connected to ground and has its other end connected to the conductor 50 and adjacent end of resistor 51. The resistor 57 and the portion of the resistor 59 connecting the resistor 57 to ground form effective means for controlling the maximum voltage impressed on the starting electrode of the tube R.

In the embodiment shown, the condenser 56 may well have a value of .005 microfarad and thus presents low impedance to alternating current components having a frequency of the order of 500 cycles per second and presents high impedance to alternating current components of the order of the low frequency motor drive signals. Consequently, the high frequency signals are transmitted by condenser 56 to the starting electrode R' of the tube R whereas the low frequency motor drive signals are not. The value of resistor 57 may be 10,000 ohms and the resistor 59 may have a value of 100,000 ohms.

The energization and deenerization of the relay S respectively establishes and interrupts an energizing circuit connection between the supply conductors L' and L² for the device T. The latter may be a control device, or a lamp or other indicator. The amplified rupture-detecting signal voltage transmitted by the conductor 55 and condenser 56 to the starting electrode R' of the tube R is of ample value to make the tube R conductive when the oscillating circuit elements have the values mentioned above by way of example, and when the valve G is arranged in the voltage amplifier as illustrated. When the tube R is made conductive as above described, it remains conductive regardless of the voltage of the starting electrode R' of the tube R until the energizing circuit for the tube R is interrupted, as by opening the switch 60 in the alternating current supply conductor L'.

The opening of switch 60 deenergizes the apparatus shown in the drawing. Deenergization of the apparatus following a thermocouple breakage is ordinarily necessary, or at least desirable, to facilitate the replacement of the broken thermocouple by a thermocouple which is intact. The switch 60 may be manually adjusted by the user of the apparatus when the necessity for such thermocouple replacement is made apparent, as by the energization of the device T, when the latter is in the form of an indicator. When the device T is a control device, it may be arranged to effect some control action made appropriate by the failure of the thermocouple. For example, it may be used to open the switch 60. In some cases, the device T may be omitted and the relay S may be arranged to open the switch 60 when energized. In such case, the switch 60 is preferably of such character that the deenergization of the tube R will not automatically close the switch.

While the adaptation of the well known conversion type, self-balancing potentiometer, illustrated in the drawing, for use in accordance with the present invention requires the addition of elements, such as the elements Q, R, S and T, and associated circuit elements, it requires only minor modifications of the previously used apparatus. Those modifications comprise the connection of the conductors 55 and 50 to the anode of valve G and to conductor 26, respectively, and a relocation of the ground connection to the branch of the measuring circuit network including the thermocouple. In the conversion type apparatus it has been the custom heretofore to make a ground connection to the conductor designated 17 herein. In the drawing that ground connection is replaced by the ground connection 54.

The use of the two condensers 52 and 53 through which the resistor 51 is separately connected to the two leads of the thermocouple D contributes to operational reliability. For one thing they permit the apparatus to remain in operation during periods in which one of the condensers is, and the other condenser is not, operative. It will be apparent, however, that one of the condensers may be eliminated without changing the general operation of the apparatus. Thus, for example, if the ground connection 54 is connected to the end of the thermocouple lead which is connected to the conductor 10, and if one of the condensers is connected to the end of the other thermocouple lead which is connected to the conductor 11, the elimination of the other condenser will leave the apparatus operative to impress a rupture-detecting signal on the electronic amplifier system when the thermocouple breaks at any point along its length.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. A self-balancing measuring and control apparatus combination, comprising a normally balanced circuit network, a thermocouple having terminals connected to said network for measurement of its voltage, and unbalancing the network on a change in its voltage, a reversible motor operable to rebalance said circuit when unbalanced, an amplifier including an input circuit and an output circuit and electronic valve amplifying means connected between said input and output circuits, said motor having a control winding connected to said output circuit, amplifier energizing means for supplying alternating current to said amplifier, and means impressing on said input circuit an alternating current, rebalancing signal which is of the same frequency as said current and varies in magnitude in predetermined proportion to the extent of network unbalance and is dependent in phase on the direction of network unbalance, means associated with said thermocouple and operative on rupture of the latter to impress on said input circuit a second signal differing in character from the first mentioned signal, the last mentioned means comprising a second signal current source having terminals connected to the thermocouple terminals, and means connected to said amplifier and responsive to and actuated by said second signal.

2. A self-balancing measuring and control apparatus combination, comprising a normally balanced circuit network, a thermocouple having terminals connected to said network for measurement of its voltage, and unbalancing the network on a change in its voltage, a reversible motor operable to rebalance said circuit when unbalanced, an amplifier including an input circuit and an output circuit and electronic valve amplifying means connected between said input and output circuits, said motor having a control winding connected to said output circuit, amplifier energizing means for supplying alternating current to said amplifier, and means impressing on said input circuit an alternating current, rebalancing signal which is of the same frequency as said current and varies in magnitude in predetermined proportion to the extent of network unbalance and is dependent in phase on the direction of network unbalance, ground connections to the thermocouple, means associated with said thermocouple and operative on rupture of the latter to impress on said input circuit a second signal differing in character from the first mentioned signal, the last mentioned means comprising an oscillating circuit connected to the thermocouple and delivering current pulses to the thermocouple which pass to said ground connection through the thermocouple when the latter is intact, and pass to the means for impressing the rebalancing signal on said amplifier when the thermocouple is broken, and means connected to said amplifier and responsive to and actuated by said second signal.

3. In apparatus for measuring the voltage of a thermocouple, the combination of a measuring circuit to which said thermocouple is connected, an amplifier, signal generating means energized by current flowing through said thermocouple to impress a signal on said amplifier, measuring means actuated by said signal after its amplification, a ground connection to said thermocouple, means for passing current pulses into said thermocouple of a character to pass directly to ground through the thermocouple when the latter is intact and to pass through said signal means when the thermocouple is broken and thereby actuate said signal means to impress on said amplifier a second signal differing in character from the first mentioned signal, and means connected to the amplifier for actuation by said second signal after its amplification.

4. Self balancing measuring apparatus of the known type comprising a circuit network including a slide wire resistance, a contact adjustable along said resistance and a circuit branch including a source of voltage to be measured and connected between said contact and a point in said network differing in potential from said contact by an amount varying with the adjustment of the contact along said resistance, an amplifier, means responsive to current flow through said branch for impressing a rebalancing signal on said amplifier, and relay mechanism connected to said amplifier and actuated by the amplified rebalancing signal to adjust said contact along said resistance and thereby eliminate said current flow, and in combination with said apparatus, a signal producing device connected to said branch circuit and operating on a break in said branch circuit to impress on said amplifier a second signal differing in a predetermined manner from said rebalancing signal, and a selectively responsive device connected to said amplifier and operatively responsive to the amplified second signal but not to the amplified rebalancing signal.

5. Self balancing measuring apparatus of the known type comprising a circuit network including a slide wire resistance, a contact adjustable along said resistance and a circuit branch including a source of voltage to be measured and connected between said contact and a point in said network differing in potential from said contact by an amount varying with the adjustment of the contact along said resistance, an amplifier, means responsive to current flow through said branch for impressing a rebalancing signal on said amplifier, and relay mechanism connected to said amplifier and actuated by the amplified rebalancing signal to adjust said contact along said resistance and thereby eliminate said current flow, and in combination with said apparatus, a signal producing device connected to said branch circuit and operating on a break therein to impress on said amplifier a second signal differing in a predetermined manner from said rebalancing signal, and a responsive device connected to said amplifier and operatively responsive to the amplified second signal.

6. A combination as specified in claim 5, in which said amplifier includes an input circuit on which both the rebalancing signal and the second signal are impressed and includes two output circuits, to one of which said relay mechanism is connected and to the other of which said responsive device is connected.

7. A combination as specified in claim 5, in which said amplifier includes two electronic valves, in which said rebalancing signal is successively amplified by said valves, and in which said second signal is amplified by one only of said two valves.

8. A combination as specified in claim 5, in which one of said devices comprises a gas filled tube having an anode, and in which said amplifier comprises a plurality of electronic amplifying valves and a rectifier supplying unidirectional current to the anodes of said valves and to an electrode of said gas filled tube.

9. A combination as specified in claim 5, in which each of said devices comprises a gas filled tube having an electrode connected to said amplifier.

10. A combination as specified in claim 5, in which said signal producing device is an oscillating circuit, a ground connection, and a connection to said branch circuit delivering current pulses to said branch circuit, and in which the latter has a ground connection.

11. The combination with a thermocouple, of means for measuring the thermocouple voltage comprising a measuring circuit to which the thermocouple terminals are connected and which is adjustable to impress on the thermocouple an opposing voltage equal in magnitude to the thermocouple voltage, an amplifier, means responsive to current flow through the thermocouple for impressing a rebalancing signal on the amplifier when the two voltages are unequal, means connected to the amplifier and actuated by the amplified rebalancing signal to adjust said measuring circuit as required to stop current flow through the thermocouple, signal producing means responsive to the condition of said thermocouple for impressing a second signal differing in character from the rebalancing signal on said amplifier on the occurrence of a break in the thermocouple, and a device connected to said amplifier and actuated by the amplified second signal.

12. A combination as specified in claim 11, including a ground connection to one of the two legs of the thermocouple, and in which said signal producing means comprises an oscillating circuit having one terminal connected to the second leg of the thermocouple and having a second terminal connected to ground.

13. A combination as specified in claim 11, in which a ground connection is connected to one of the two legs of the thermocouple, and in which the signal producing means comprises a condenser having one terminal connected to the other of the two thermocouple legs, a gas filled tube having one terminal connected to ground and having a second terminal connected to the second terminal of said condenser, and a resistance having one terminal connected to the connected terminals of said condenser and tube, and having its second terminal connected to a source of potential which is different from the ground potential.

14. The combination with a thermocouple normally in an operative condition but subject to deterioration putting the thermocouple in an inoperative condition, of means for measuring the thermocouple voltage comprising a measuring circuit to which the thermocouple terminals are connected and which is adjustable to impress on the thermocouple an opposing voltage equal in magnitude to the thermocouple voltage, an amplifier, means responsive to current flow through the thermocouple for impressing a rebalancing signal on the amplifier when the two voltages are unequal, means connected to the amplifier and actuated by the amplified rebalancing signal to adjust said measuring circuit as required to stop current flow through the thermocouple, signal producing means connected to the thermocouple terminals and selectively responsive to the thermocouple condition for impressing a second signal, differing in character from the rebalancing signal on said amplifier when said thermocouple is in one of its said conditions, and a device connected to said amplifier and actuated by the amplified second signal.

15. Self balancing measuring apparatus of the known type comprising a circuit network including a slide wire resistance, a contact adjustable along said resistance and a circuit branch including a source of voltage to be measured and connected between said contact and a point in said network differing in potential from said contact by an amount varying with the adjustment of the contact along said resistance, an amplifier, means responsive to current flow through said branch for impressing a rebalancing signal on said amplifier, and relay mechanism connected to said amplifier and actuated by the amplified rebalancing signal to adjust said contact along said resistance and thereby eliminate said current flow, and in combination with said apparatus, a signal producing device connected to said branch circuit to impress on said amplifier a second signal differing in a predetermined manner from said rebalancing signal, and a responsive device connected to said amplifier and operatively responsive to the amplified second signal.

16. Self balancing measuring apparatus of the known type comprising a circuit network including a slide wire resistance, a contact adjustable along said resistance and a circuit branch including a source of voltage to be measured and connected between said contact and a point in said network differing in potential from said contact by an amount varying with the adjustment of the contact along said resistance, an amplifier, means responsive to current flow through said branch for impressing a rebalancing signal on said amplifier, and relay mechanism connected to said amplifier and actuated by the amplified rebalancing signal to adjust said contact along said resistance and thereby eliminate said current flow, and in combination with said apparatus, a signal producing device connected to said branch circuit to impress on said amplifier a second signal differing in a predetermined manner from said rebalancing signal, and a selectively responsive device connected to said amplifier and operatively responsive to the amplified second signal but not to the amplified rebalancing signal.

17. A self-balancing measuring and control apparatus combination, comprising a normally balanced circuit network, a thermocouple connected to said network for measurement of its voltage, and unbalancing the network on a change in its voltage, a reversible motor operable to rebalance said circuit when unbalanced, an amplifier including an input circuit and an output circuit and electronic valve amplifying means connected between said input and output circuits, said motor having a control winding connected to said output circuit, amplifier energizing means for supplying alternating current to said amplifier, and means impressing on said input circuit an alternating current, rebalancing signal which is of the same frequency as said current and varies in magnitude in predetermined proportion to the extent of network unbalance and is dependent in phase on the direction of network unbalance, circuit means connected to said thermocouple to impress on said input circuit a second signal differing in character from the first mentioned signal, and means connected to said amplifier and responsive to and actuated by said second signal.

HERBERT A. CLARKE.

REFERENCES CITED

The following references are of record in the file of this patent:

UNITED STATES PATENTS

| Number | Name | Date |
| --- | --- | --- |
| 2,340,126 | Jones | Jan. 25, 1944 |
| 2,376,527 | Wills | May 22, 1945 |
| 2,396,091 | DeBey | Mar. 5, 1946 |